United States Patent [19]

Achermann

[11] Patent Number: 5,400,988
[45] Date of Patent: Mar. 28, 1995

[54] INDICATOR PANEL WITH INTEGRAL HAND ACTUATED FASTENERS

[75] Inventor: Peter Achermann, Ebikon, Switzerland

[73] Assignee: Inventio AG, Hergiswil NW, Switzerland

[21] Appl. No.: 57,264

[22] Filed: May 4, 1993

[30] Foreign Application Priority Data

May 4, 1992 [CH] Switzerland .................. 01428/92

[51] Int. Cl.⁶ .............................................. G12B 9/00
[52] U.S. Cl. ................................ 248/27.3; 248/222.1
[58] Field of Search ................ 248/27.3, 906, 222.1; 187/135, 136

[56] References Cited

U.S. PATENT DOCUMENTS

| 2,288,637 | 7/1942 | Mauro | 248/906 X |
| 3,793,563 | 2/1974 | Brefka | 248/27.3 X |
| 4,098,423 | 7/1978 | Marrero | 248/27.3 X |
| 4,706,359 | 11/1987 | Greenhill, Sr. et al. | 248/906 X |
| 4,733,330 | 3/1988 | Tonaka et al. | 248/906 X |
| 4,924,974 | 5/1990 | Orndorff et al. | 187/136 X |

FOREIGN PATENT DOCUMENTS

| 34098 | 4/1973 | Australia . |
| 2082120 | 10/1971 | Germany . |
| 2419900 | 10/1975 | Germany . |
| 3513762 | 10/1986 | Germany . |
| 9102425 | 6/1991 | Germany . |

Primary Examiner—Alvin C. Chin-Shue
Assistant Examiner—Korie H. Chan
Attorney, Agent, or Firm—Howard & Howard

[57] ABSTRACT

An indicator panel includes a generally rectangular frame having an outwardly extending surrounding flange and two pairs of generally parallel sides defining an opening. The frame is releasably retained in a recess formed in a mounting plate such that the surrounding flange covers the recess and abuts a front side of the mounting plate. A plurality of stops are provided on the inside walls of the frame for retaining a circuit board in the opening and a cover plate is attached to the frame to cover the opening. One pair of the sides is tubular having a longitudinally extending aperture interrupted by a central wall and pairs of first and second openings formed on opposite sides of the walls. Slidably retained in each aperture on opposite sides of the wall are latches for releasably fastening the indicator panel to the mounting plate. Each latch is formed as one piece from an elastic synthetic material with a head portion connected to a foot portion by a spring. A first latch cam engages the second opening in the latched position to permit the indicator panel to be inserted into the recess in the mounting plate and a slight finger pressure on the first guide finger permits the first latch cam to be moved to the first opening to engage the head portion with an edge of the recess.

20 Claims, 2 Drawing Sheets

INDICATOR PANEL WITH INTEGRAL HAND ACTUATED FASTENERS

BACKGROUND OF THE INVENTION

The present invention relates generally to an apparatus for fastening panels to mounting plates and, in particular, to an indicator panel with integral fasteners for an elevator system.

There is shown in the German design patent DE-GM-U1 G 91 02 425.0 an indicator panel having a housing, a cover plate and a circuit board with electronic and/or electromechanical components. The housing includes a back wall and surrounding, forwardly extending side walls on which are formed stops for the mounting of the cover plate. Detent rails and snap couplings are provided for a detachable connection between the housing and the cover plate. If concealed wiring is to be used, the housing is attached to a mounting plate, for example on a metal sheet, by a bracket which is supported on the rear surface of the mounting plate. Thus, the housing is held tightly in an opening formed in the mounting plate corresponding to the size of the housing.

Such housings typically are installed in tight spaces in which work with installation tools such as wrenches make the mounting difficult.

SUMMARY OF THE INVENTION

The present invention concerns an indicator panel, such as for use in an elevator system, having a frame formed of two pairs of generally parallel sides surrounding an opening in the frame, one of said pairs of generally parallel sides being tubular with a longitudinally extending aperture formed therein, each of the apertures having opposite open ends and a wall interrupting the aperture in a central portion thereof. A flange extends outwardly from the sides of the frame and a plurality of stops are formed on the sides for supporting a circuit board in the opening. A cover plate is attached to the frame and closes the opening. A releasable latch is slidably retained in an associated one of each of the open ends of the apertures for movement between a latched position for inserting the frame into a recess formed in a mounting plate and an unlatched position for retaining the frame in the recess with the flange abutting a front surface of the mounting plate.

Each of the latches can be formed as one piece from an elastic synthetic material and includes a spring connected between a head portion and a foot portion, the foot portion being adjacent to the wall in the aperture and the spring biasing the head portion toward the unlatched position. Each of the tubular sides has a pair of first and a second openings formed therein on opposite sides of the wall, the first and second openings being connected to the aperture. Each head portion includes first and second guide fingers extending toward the foot portion on opposite sides of the spring. The first guide finger has first and second latch cams formed thereon, the first latch cam engaging the second openings in the tubular side for retaining the latch in the latched position and the second latch cam engaging the second opening for retaining the latch in the unlatched position. Each foot portion includes a third and a fourth guide finger extending toward the head portion for slidably engaging an interior wall of the aperture. Each of the head portions also has a bevel end surface for engaging the edge of the recess.

The advantages achieved by the present invention are that the indicator panel is retained in the mounting plate without screws or other fasteners requiring tools, which in turn assures a connection between the indicator panel and the mounting plate which is insensitive to shock. A further advantage is that the fastener according to the present invention permits the use of mounting plates of different thicknesses. A further advantage is that deviations between the dimensions of recesses in different mounting plates can be accommodated by the fasteners according to the present invention.

Thus, the present invention avoids the drawbacks of the known devices by providing an indicator panel which can be mounted and dismounted with simple hand manipulation and without tools.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
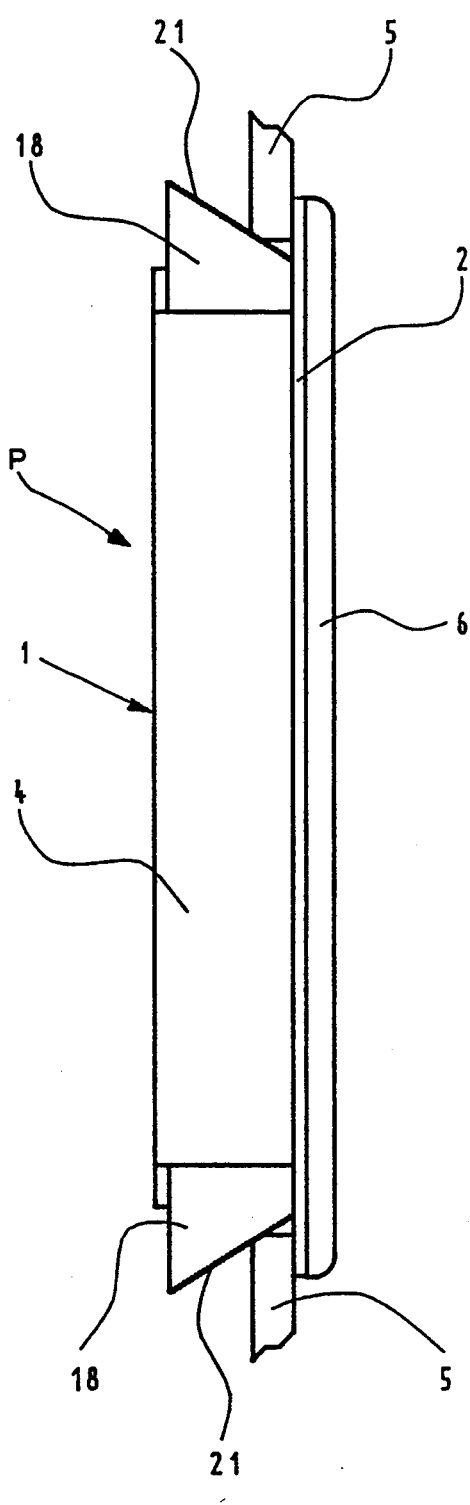
FIG. 1 is a fight side elevational view of an indicator panel according to the present invention installed in a mounting plate.
Figure 2:
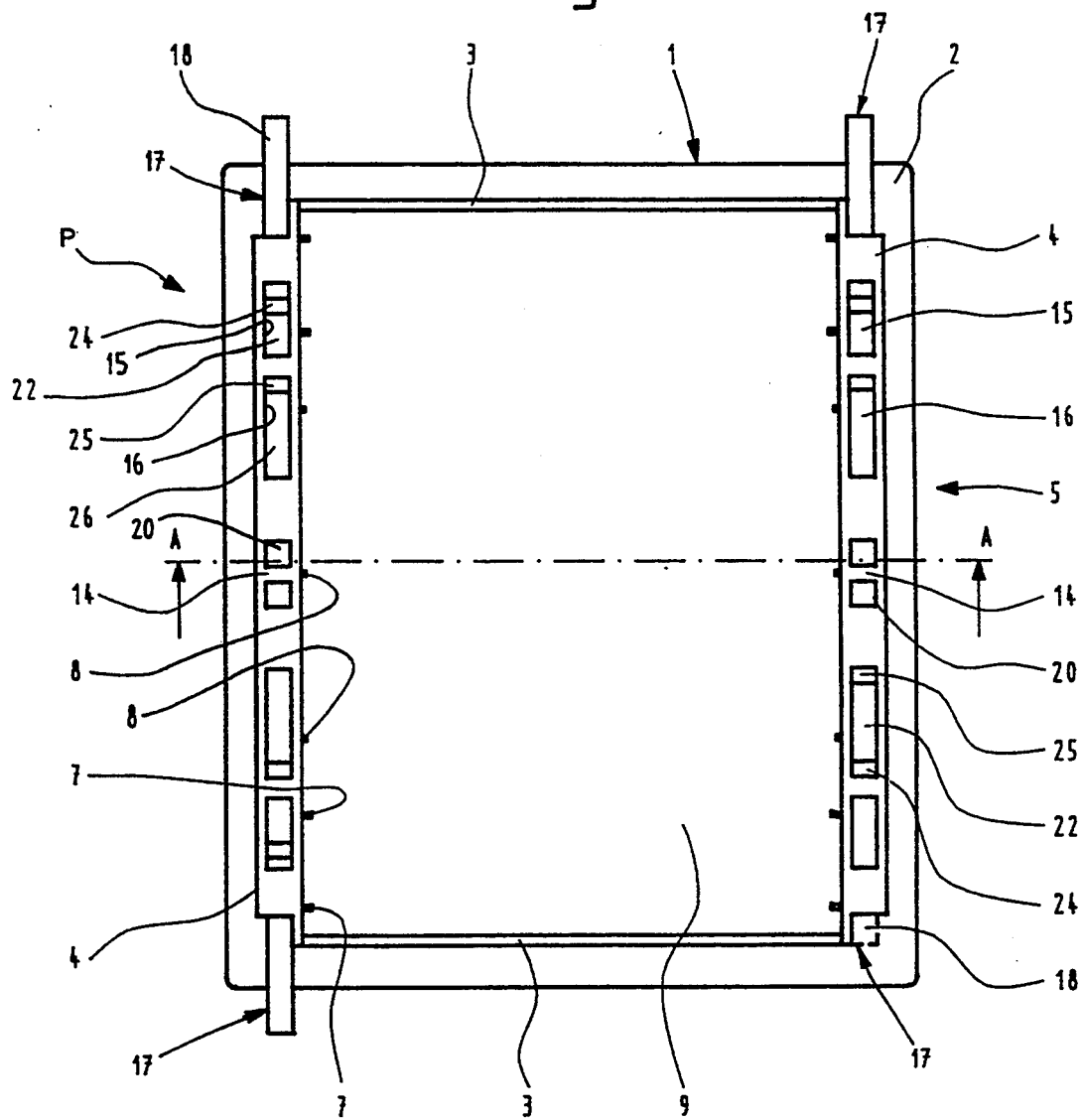
FIG. 2 a rear view of the indicator panel shown in the FIG. 1 before it is installed in the mounting plate.
Figure 3:
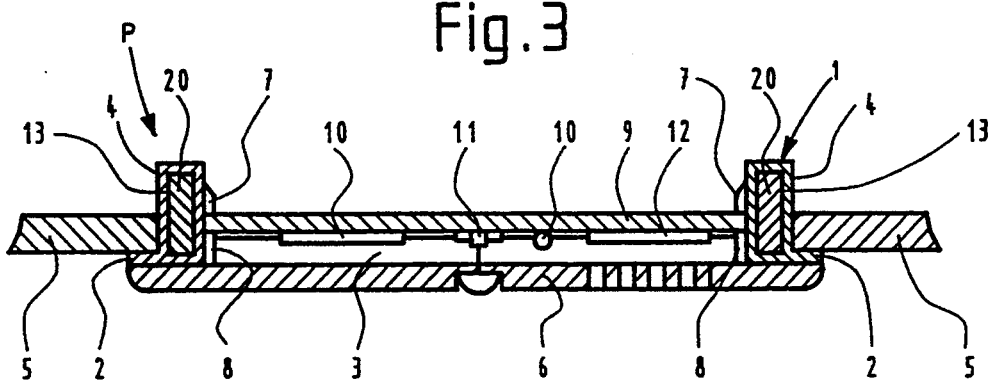
FIG. 3 is a cross-sectional view of the indicator panel and the mounting plate shown in the FIG. 1 as if taken along the line A—A in the FIG. 2.

There is shown in the FIGS. 1 through 3, an indicator panel P including a generally rectangular shaped frame 1 having an outwardly extending surrounding flange 2 formed at a front surface thereof. The frame 1 has a pair of generally parallel shorter sides 3 extending along a top and bottom thereof and a pair of generally parallel, vertically extending longer sides 4 extending between corresponding ends of the shorter sides 3. The sides 3 and 4 define an opening in the frame and extend into a recess formed in a mounting plate 5 such that the surrounding flange 2 covers the recess and abuts a front side of the mounting plate 5. A cover plate 6 is attached to the front side of the flange 2, for example by an adhesive. On the facing surfaces of the sides 4 there are formed a plurality of spaced apart stops, rear stops 7 and front stops 8, for retaining a circuit board 9 therebetween in the opening in the frame 1. The rear stops 7 extend rearwardly from a rear surface of the board 9 and the front stops 8 extend forwardly from a front surface of the board such that the board 9 can be inserted between the stops 7 and 8 from either the top or the bottom of the frame 1. Mounted on a front surface of the board 9 can be one or more electronic circuit components 10, such as resistors and capacitors, one or more switches 11, and one or more acoustical and optical indicating components 12, such as light emitting diodes, loudspeakers or visual screens.

As shown in the FIG. 3, the sides 4 are tubular with a generally rectangular cross section and a similarly shaped longitudinally extending aperture 13 which is interrupted centrally between the open ends thereof by a wall 14. Formed in the rearwardly facing surface of the sides 4, adjacent each end of the aperture 13, is a pair of first openings 15. Also formed in the rearwardly facing surface of the sides 4, adjacent opposite sides of the wall 14, is a pair of second openings 16. The first openings 15 and the second openings 16 connect with the aperture 13. Extending from each open end of the apertures 13 is a latch 17 for releasably retaining the frame 1 in the recess in the mounting panel 5 as shown in the FIG. 1.

Figure 4:
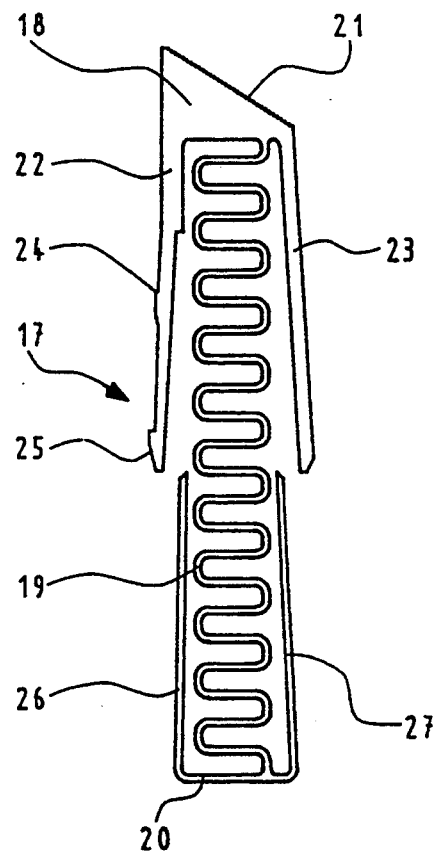
FIG. 4 is an enlarged right side elevational view of one of the releasable latches shown in the FIGS. 1 through 3 in the unlatched position.
Figure 5:
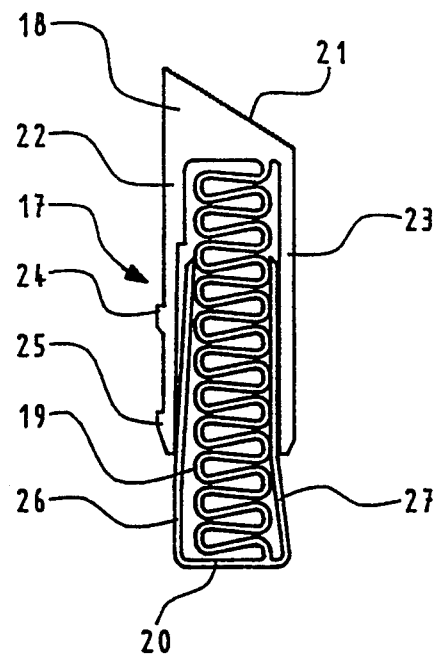
FIG. 5 is a view similar to the FIG. 4 showing the latch in the latched position.

As shown in more detail in the FIGS. 4 and 5, a head portion 18 of the latch 17 is connected to a foot portion 20 by a spring 19 with the foot portion 20 of each of the latches 17 abutting a facing side of the associated one of the walls 14 (FIG. 2). The head portion 18 is provided with a bevel end surface 21 which is angled toward the associated end of the side 4 from a rear edge to a front edge. The surfaces 21 are forced against the top and bottom edges of the recess in the mounting panel 5, as shown in the FIG. 1, to retain the indicator panel P in the installed position. The head portion 18 is connected to one end of the spring 19 and has a first guide finger 22 extending from a rear edge toward the foot portion 20 and a second guide finger 23 extending from a front edge toward the foot portion 20. Formed on and extending outwardly from a rearwardly facing surface of the first guide finger 22 is a first latch cam 24 and a second latch cam 25. The cam 25 is positioned at the free end of the finger 22 and the cam 24 is spaced from the cam 25 toward the surface 21. The foot portion 20 has a third guide finger 26 extending from a rear edge toward the head portion 18 and a fourth guide finger 27 extending from a front edge toward the head portion 18. The latches 17 can be formed as one piece of an elastic synthetic material which permits the fingers 22, 23, 26 and 27 to bend toward and away from the spring 19.

If the latch 17 is in the unlatched position, shown in the FIG. 4 and by three latches in solid lines in the FIG. 2, the cams 24 and 25 extend into the openings 15 and 16 respectively. The second latch cam 25 is forced by the spring 19 against the outer end of the second opening 16, while the first latch cam is free in the first opening 15, to retain the latch 17 in the aperture 13. Thus, the latches 17 cannot fall out of the open ends of the apertures 13. When the latches 17 are in the latched position, shown in the FIG. 5 and by one latch in broken lines in the FIG. 2, the guide fingers 22 and 23 slide over the guide fingers 26 and 27 respectively. Thus, the guide fingers 26 and 27 prevent a lateral buckling of the spring 19 and slide along the interior wall of the apertures 13. The first latch cam 24 is forced by the spring 19 against the outer end of the second opening 16 while the second latch cam 25 is free in the second opening 16. In order to release the latch 17 from the latched position, a slight pressure is applied by hand to the first guide finger 22 thereby permitting the cam 24 to move from the opening 16 to the opening 15. The position of the latches 17 when the indicator panel P is mounted in the recess in the mounting plate 5 is between the latched and unlatched positions.

In order to install the indicating panel P in the recess in the mounting plate 5, all of the latches 17 are placed in the latched position shown in the FIG. 5. The latched position permits the bevel end surfaces 21 to clear the upper and lower edges of the recess and the frame 1 to enter the recess until the flange 2 abuts the front surface of the mounting plate 5. The first guide fingers 22 are detented to permit the first latch cams 24 to move from the second opening 16 to the first opening 15 whereby the springs 19 force the bevel end surfaces 21 into engagement with the upper and lower edges of the recess as shown in the FIG. 1. Thus, movement of the latches 17 between the latched and the unlatched positions requires only slight hand pressure and no tools.

Although a generally rectangular frame 1 is shown, the indicator panel P can utilize any suitable frame shape as long as at least one side can be provided with the latches 17. The fasteners formed by the tubular sides 4 with the apertures 13 and the walls 14, and the latches 17 permit the indicator panel to be retained in the mounting plate without screws or other fasteners requiring tools, which in turn assures a connection between the indicator panel and the mounting plate which is insensitive to shock. The bevel end surfaces 21 permit the indicator panel P to be installed in mounting plates of different thicknesses and further accommodate deviations between the dimensions of recesses in different mounting plates.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An indicator panel for attachment to a mounting plate having a front surface and a recess formed therein, the recess having an edge at the front surface, the indicator panel including a frame formed of a plurality of sides surrounding an opening, a flange extending outwardly from the sides, a plurality of stops formed on the sides for supporting a circuit board in the opening, a cover plate attached to the frame and closing the opening, and fasteners for releasably retaining the frame in the recess formed in the mounting plate with the flange covering the recess and abutting the front surface of the mounting plate, the fasteners comprising:

at least a pair of the sides of the frame being generally tubular sides, each of said tubular sides having a longitudinally extending aperture formed therein, each said aperture having an interior wall extending between opposite open ends; and at least a pair of releasable latches, each said releasable latch slidably retained in an associated one of said apertures for movement along said interior wall between a latched position for inserting the frame into the recess in the mounting plate and an unlatched position extending from one of said open ends of said associated aperture permitting said releasable latch to engage the edge of the recess to retain the frame in the recess.

2. The indicator panel according to claim 1 wherein each of said tubular sides has a first opening and a second opening formed therein in communication with said aperture, at least one of said first and second openings releasably retaining said releasable latch in said unlatched position and in said latched position.

3. The indicator panel according to claim 2 wherein each said interior walls has a central wall attached thereto and interrupting said aperture in a central portion thereof and each of said releasable latches includes a head portion, a foot portion and a spring connected between said head portion and said foot portion, said foot portion being adjacent said central wall and said spring biasing said head portion toward said unlatched position.

4. The indicator panel according to claim 3 wherein each said head portion includes a first guide finger and a second guide finger extending toward said foot portion on opposite sides of said spring, said first guide finger having a first latch cam formed thereon for engaging said first and second openings in said tubular side and a second latch cam formed thereon for engaging said second opening in said tubular side.

5. The indicator panel according to claim 4 wherein each said foot portion includes a third guide finger and a fourth guide finger extending toward said head portion for slidably engaging said interior wall of said aperture whereby said first and second guide fingers slide over said third and fourth guide fingers in said latched position.

6. The indicator panel according to claim 1 wherein each of said releasable latches is formed as one piece from an elastic synthetic material.

7. The indicator panel according to claim 1 wherein each of said releasable latches has a head portion extending from said associated open end of said aperture, said head portion having a bevel end surface for engaging the edge of the recess.

8. An indicator panel for attachment to a mounting plate having a front surface and a recess formed therein, the recess having an edge at the front surface, the indicator panel comprising:
a frame formed of a plurality of sides surrounding an opening in said frame, at least one of said sides being tubular with a longitudinally extending aperture formed therein, said aperture having an interior wall extending between opposite open ends, and a central wall attached to said interior wall and interrupting said aperture in a central portion thereof;
a flange extending outwardly from said sides;
a plurality of stops formed on said sides for supporting a circuit board in said opening;
a cover plate attached to said frame and closing said opening; and
a pair of releasable latches each slidably retained in an associated one of said open ends of said aperture for movement between a latched position toward said central wall for inserting said frame into the recess formed in the mounting plate and an unlatched position toward said associated open end for retaining said frame in the recess with said flange abutting the front surface of the mounting plate.

9. The indicator panel according to claim 8 wherein said tubular side has a first opening and a second opening-formed therein between said central wall and each of said open ends, said first and second openings in communication with said aperture, at least one of said first and second openings releasably retaining an associated one of said releasable latches in said unlatched position and in said latched position.

10. The indicator panel according to claim 2 wherein each of said releasable latches includes a head portion, a foot portion and a spring connected between said head portion and said foot portion, said foot portion being adjacent said central wall and said spring biasing said head portion toward said unlatched position.

11. The indicator panel according to claim 10 wherein each said head portion includes a first guide finger and a second guide finger extending toward said foot portion on opposite sides of said spring, said first guide finger having a first latch cam formed thereon for engaging said first and second openings in said tubular side and a second latch cam formed thereon for engaging said second opening.

12. The indicator panel according to claim 11 wherein each said foot portion includes a third guide finger and a fourth guide finger extending toward said head portion for slidably engaging said interior wall of said aperture whereby said first and second guide fingers slide over said third and fourth guide fingers in said latched position.

13. The indicator panel according to claim 11 wherein each of said releasable latches is formed as one piece from an elastic synthetic material.

14. The indicator panel according to claim 8 wherein each of said releasable latches has a head portion extending from said associated open end of said aperture, said head portion having a bevel end surface for engaging the edge of the recess.

15. An indicator panel for attachment to a mounting plate, the mounting plate having a front surface and a recess formed therein with an edge at the front surface, the indicator panel comprising:
a frame formed of two pairs of generally parallel sides surrounding an opening in said frame, one of said pairs of generally parallel sides being tubular with a longitudinally extending aperture formed in each side of said one pair of sides, each said aperture having an interior wall extending between opposite open ends, and a central wall attached to said interior wall and interrupting each said aperture in a central portion thereof;
a flange extending outwardly from said sides;
a cover plate attached to said frame and closing said opening;
a plurality of releasable latches each slidably retained in an associated one of said open ends of said apertures for movement between a latched position toward said central wall for inserting said frame into the recess formed in the mounting plate and an unlatched position for retaining said frame in the recess with said flange abutting the front surface of the mounting plate.

16. The indicator panel according to claim 15 wherein each of said releasable latches is formed as one piece from an elastic synthetic material and includes a head portion, a foot portion and a spring connected between said head portion and said foot portion, said foot portion being adjacent said central wall and said spring biasing said head portion toward said unlatched position.

17. The indicator panel according to claim 16 wherein each of said tubular sides has a pair of first and second openings formed therein between said central wall and each of said open ends, said first and second openings in communication with said aperture, and each said head portion includes a first guide finger and a second guide finger extending toward said foot portion on opposite sides of said spring, said first guide finger having a first latch cam formed thereon for engaging an associated one of said second openings in said tubular side for retaining said releasable latch in said latched position and a second latch cam formed thereon for engaging said associated second opening for retaining said releasable latch in said unlatched position.

18. The indicator panel according to claim 17 wherein each said foot portion includes a third guide finger and a fourth guide finger extending toward said head portion for slidably engaging said interior wall of said aperture whereby said first and second guide fingers slide over said third and fourth guide fingers in said latched position.

19. The indicator panel according to claim 16 wherein each of said head portions has a bevel end surface for engaging the ledge of the recess in the mounting plate.

20. The indicator panel according to claim 15 including a plurality of stops formed on said sides for supporting a circuit board in said opening.

* * * * *